(12) United States Patent
Rolland

(10) Patent No.: US 12,441,054 B2
(45) Date of Patent: Oct. 14, 2025

(54) ADDITIVE MANUFACTURING WITH DUAL PRECURSOR RESINS

(71) Applicant: Carbon, Inc., Redwood City, CA (US)

(72) Inventor: Jason P. Rolland, San Carlos, CA (US)

(73) Assignee: Carbon, Inc., Redwood City, CA (US)

( * ) Notice: Subject to any disclaimer, the term of this patent is extended or adjusted under 35 U.S.C. 154(b) by 139 days.

(21) Appl. No.: 18/474,433

(22) Filed: Sep. 26, 2023

(65) Prior Publication Data

US 2024/0009921 A1   Jan. 11, 2024

Related U.S. Application Data

(62) Division of application No. 17/324,502, filed on May 19, 2021, now abandoned.

(60) Provisional application No. 63/038,938, filed on Jun. 15, 2020.

(51) Int. Cl.
| | | |
|---|---|---|
| *B29C 64/118* | (2017.01) | |
| *B29C 64/209* | (2017.01) | |
| *B33Y 10/00* | (2015.01) | |
| *B33Y 30/00* | (2015.01) | |
| *B33Y 70/00* | (2020.01) | |
| *B29K 63/00* | (2006.01) | |
| *B29K 75/00* | (2006.01) | |
| *B29K 83/00* | (2006.01) | |
| *B29K 105/00* | (2006.01) | |

(52) U.S. Cl.
CPC .......... *B29C 64/118* (2017.08); *B29C 64/209* (2017.08); *B33Y 10/00* (2014.12); *B33Y 30/00* (2014.12); *B33Y 70/00* (2014.12); *B29K 2063/00* (2013.01); *B29K 2075/00* (2013.01); *B29K 2083/00* (2013.01); *B29K 2105/0002* (2013.01)

(58) Field of Classification Search
CPC .................................................. B29C 64/282
See application file for complete search history.

(56) References Cited

U.S. PATENT DOCUMENTS

| | | |
|---|---|---|
| 3,694,389 A | 9/1972 | Levy |
| 6,259,962 B1 | 7/2001 | Gothait |
| 6,433,121 B1 | 8/2002 | Petrovic et al. |
| 9,453,142 B2 | 9/2016 | Rolland et al. |
| 9,598,606 B2 | 3/2017 | Rolland et al. |
| 9,676,963 B2 | 6/2017 | Rolland et al. |

(Continued)

FOREIGN PATENT DOCUMENTS

WO   WO-2018237038 A1 * 12/2018   ........... B29C 64/245

OTHER PUBLICATIONS

Merriam-Webster. (n.d.). "Combine", In Merriam-Webster.com dictionary. Retrieved May 19, 2023, from https://www.merriam-webster.com/dictionary/combine, 2023.

(Continued)

*Primary Examiner* — Timothy Kennedy
(74) *Attorney, Agent, or Firm* — Myers Bigel, P.A.

(57) ABSTRACT

Apparatus for, and associated method of, making a three-dimensional object from a light polymerizable resin by inkjet additive manufacturing are described. The methods and apparatus employ dual precursor resins, including but not limited to dual cure resins having a first component photopolymerizable and a second component polymerizable by a mechanism different from the first component.

11 Claims, 1 Drawing Sheet

(56) References Cited

U.S. PATENT DOCUMENTS

| | | | |
|---|---|---|---|
| 10,350,823 B2 | 7/2019 | Rolland et al. | |
| 2004/0187714 A1* | 9/2004 | Napadensky | B29C 64/112 |
| | | | 101/35 |
| 2012/0225208 A1* | 9/2012 | Tanaka | B29C 64/112 |
| | | | 118/712 |
| 2013/0026683 A1 | 1/2013 | Ng et al. | |
| 2017/0306171 A1* | 10/2017 | Vidavsky | B29C 64/188 |
| 2018/0029361 A1 | 2/2018 | Jeuté | |
| 2018/0370117 A1 | 12/2018 | Gardiner et al. | |
| 2019/0054681 A1 | 2/2019 | Fenn et al. | |
| 2019/0255863 A1 | 8/2019 | Cole | |
| 2019/0283316 A1 | 9/2019 | Rolland et al. | |
| 2020/0156308 A1 | 5/2020 | Ramos et al. | |

OTHER PUBLICATIONS

Merriam-Webster. (n.d.). "Precursor", In Merriam-Webster.com dictionary. Retrieved May 19, 2023, from https:// www .merriam-webster.com/dictionary/precursor, 2023.

\* cited by examiner

ADDITIVE MANUFACTURING WITH DUAL PRECURSOR RESINS

CROSS-REFERENCE TO RELATED APPLICATIONS

This application is a divisional of U.S. patent application Ser. No. 17/324,502, filed May 19, 2021, which claims the benefit of Provisional Application No. 63/038,938, filed Jun. 15, 2020, the disclosures of which are incorporated by reference herein.

FIELD OF THE INVENTION

The present invention concerns methods and apparatus for additive manufacturing with light polymerizable resins.

BACKGROUND OF THE INVENTION

Inkjet-type additive manufacturing methods and apparatus have been known for some time. See, e.g., U.S. Pat. No. 6,259,962 to Gothait. Advantages of these techniques include the ability to dispense ("jet") different materials—including colors—on a voxel level; the ability to jet dissolvable support material throughout the growing object during fabrication thereof; and the ability to do so with good surface finish and resolution. Unfortunately, materials compatible with jetting are limited by viscosity, typically to resins having a viscosity on the order of 10 centipose. As a result, most parts made by material jetting use low viscosity monomers that results in brittle parts with poor mechanical properties.

Accordingly, there is a need for new approaches to material jet additive manufacturing.

SUMMARY OF THE INVENTION

Apparatus for, and associated method of, making a three-dimensional object from a light polymerizable resin by inkjet (or "material jet") additive manufacturing are described. The methods and apparatus employ dual precursor resins.

In some embodiments, the dual precursor resin is a dual cure resin. The dual cure resin includes a first polymerizable component and a second polymerizable component. The first component is photopolymerizable and the second component is polymerizable by a mechanism different from the first component. An intermediate three-dimensional object is formed by light polymerization of the first component during the additive manufacturing. The second component is cured (concurrently with forming the object or subsequently to forming the object) by a mechanism different from the first component (e.g., heat, contact to moisture, exposure to light at a wavelength different from that at which said first component is polymerized, contacting to a catalyst, or a combination thereof) to form said three-dimensional object.

In some embodiments, the apparatus does not require pre-mixing of the precursor resins prior to jetting, but jets the precursor resins through separate orifices that are positioned so that the precursor resins mix after jetting but before, or upon, deposition. Such apparatus and the associated methods may be used with dual precursor resins that are single cure resins, as well as dual precursor resins that are dual cure resins.

Ramos et al., Inkjet 3d printing of multi-component resins, US Patent App. Serial No. US 2020/0156308 (published May 21, 2020), describes systems in which two precursor resins are mixed prior to jetting through nozzles in an inkjet printing system. The precursor resins are described as highly reactive with one another, and the reference does not describe inclusion of a photopolymerizable component as is found in dual cure resins. Consequently, the apparatus must be cleaned and/or purged of reacted resin to avoid plugging or contamination of the apparatus, and the variety of resins (and the range of materials produced therefrom) are limited to those that are highly reactive.

Dual cure resins for bottom-up and top-down stereolithography techniques such as continuous liquid interface production (CLIP) are known and described in, for example, U.S. Pat. Nos. 9,676,963, 9,453,142 and 9,598,606 to Rolland et al, and dual precursor resin systems for use with dual cure resins are described in U.S. Pat. No. 10,350,823 to Rolland et al, but they have not heretofor been suggested for inkjet-type additive manufacturing.

Accordingly, provided herein according to some embodiments is a method of making a three-dimensional object, comprising some or all of the steps of: (a) jetting droplets of at least one dual cure resin or precursor thereof through at least one nozzle carried by a print head of a three-dimensional printing apparatus to form a deposited dual cure resin portion, the dual cure resin comprising a first polymerizable component and a second polymerizable component, wherein said first component is photopolymerizable and said second component is polymerizable by a mechanism different from said first component; (b) polymerizing said first component with light (e.g., ultraviolet (UV) light); (c) repositioning said print head; and (d) repeating steps (a) through (c) to form a newly deposited dual cure resin portion on or adjacent to a previously deposited dual cure resin portion until an intermediate three-dimensional object is formed; and (e) curing said second component by a mechanism different from said first component to produce said three-dimensional object.

In some embodiments, the dual cure resin is produced by providing first and second precursor resins, with said precursor resins being combined in a mixer, the mixer operatively connected to said at least one nozzle, to form said dual cure resin prior to jetting said resin from said nozzle.

In some embodiments, one of said precursor resins comprises an unblocked polyisocyanate, and the other of said precursor resins comprises a polyol, a polyamine, or a combination thereof.

In some embodiments, the at least one dual cure resin or precursor thereof is heated (e.g., to 50, 60, or 70 degrees Centigrade, or more) prior to said jetting step to reduce the viscosity thereof (e.g., to 100 cP or less).

In some embodiments, the at least one dual cure resin or precursors thereof comprises a solvent in an amount (e.g., 10 percent by weight to 50 or 75 percent by weight) effective to reduce the viscosity thereof during said jetting step (e.g., a glycol ether, alcohol, or volatile solvent such as a hydrofluorocarbon solvent (e.g., a 2,3-dihydrodecafluoropentane solvent such as VERTREL™ XM)).

In some embodiments, at least a portion (preferably a major portion) of said solvent evaporates from said droplets prior to said droplets forming said deposited dual cure resin portion.

In some embodiments, the first component is included in said resin in an amount of not more than 5, 10, 15 or 20 percent by weight.

In some embodiments: (i) at least two different dual cure resins or precursors thereof that generate finished objects of different tensile properties (e.g., rigid versus elastic) are provided through separate orifices; and (ii) said jetting step includes selectively jetting said at least two different dual cure resins or precursors thereof (sequentially, concurrently, or combinations thereof) in a patterned manner to form a three-dimensional object having different tensile properties in different portions thereof (e.g. an object with rigid portions joined by a flexible hinge portion).

In some embodiments, the second component comprises a precursor to a polyurethane, polyurea, epoxy polymer, cyanate ester polymer, silicone polymer, or combination thereof.

In some embodiments, the curing step (e) is carried out after forming said three-dimensional object (e.g., carried out by heating, microwave irradiating, contacting to water, exposure to light at a wavelength different from that at which said first component is polymerized, contacting to a catalyst, or a combination of two or more thereof).

An apparatus for producing a three-dimensional object by additive manufacturing is also provided, which may comprise some or all of: (a) a printing head having at least a first nozzle and a second nozzle through which precursor resins can be jetted; (b) a build platform on which a three-dimensional object can be formed by successive deposition of deposited resin portions from said precursor resins after jetting; (c) a positioning apparatus operatively associated with said printing head and said build platform; (d) a first precursor resin supply operatively associated with said first nozzle; and (e) a second precursor resin supply operatively associated with said second nozzle; wherein said first nozzle and said second nozzle are configured to combine said first and second precursor resins after being jetted and produce a complete (single or dual cure) resin prior to or upon forming said deposited resin portions.

In some embodiments the apparatuse may include: (f) a light source (e.g., an ultraviolet light source) operatively associated with said build platform and configured to photopolymerize said deposited resin portions (e.g., when said deposited resin portions comprise a dual cure resin).

Also provided is a method of making a three-dimensional object, comprising some or all of the steps of: (a) concurrently jetting droplets of a first precursor resin and a second precursor resin through separate nozzles, the nozzles carried by the same print head of a three-dimentional printing apparatus, the nozzles configured to combine said first and second precursor resins after jetting and produce a complete (single or dual cure) resin prior to or upon forming a deposited resin portion; (b) optionally photopolymerizing said deposited resin portion (e.g., with UV light); (c) repositioning said print head; and (d) repeating steps (a) through (c) to form a newly deposited resin portion on or adjacent a previously deposited resin portion, until said three-dimensional object is formed.

In some embodiments, the complete resin comprises a dual cure resin, and said photopolymerizing step (b) is included.

In some embodiments, one of said precursor resins comprises an unblocked polyisocyanate, and the other of said precursor resins comprises a polyol, a polyamine, or a combination thereof.

In some embodiments, one or both of said precursor resins is heated (e.g., to 50, 60, or 70 degrees Centigrade, or more) prior to said jetting step to reduce the viscosity thereof (e.g., to 100 cP or less).

In some embodiments, one or both of said precursor resins comprises a solvent in an amount (e.g., 10 percent by weight to 50 or 75 percent by weight) effective to reduce the viscosity thereof during said jetting step (e.g., a glycol ether, alcohol, or volatile solvent such as a hydrofluorocarbon solvent (e.g., a 2,3-dihydrodecafluoropentane solvent such as VERTREL™ XM)).

In some embodiments, at least a portion (preferably a major portion) of said solvent evaporates from said droplets prior to said droplets forming said deposited resin portion.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
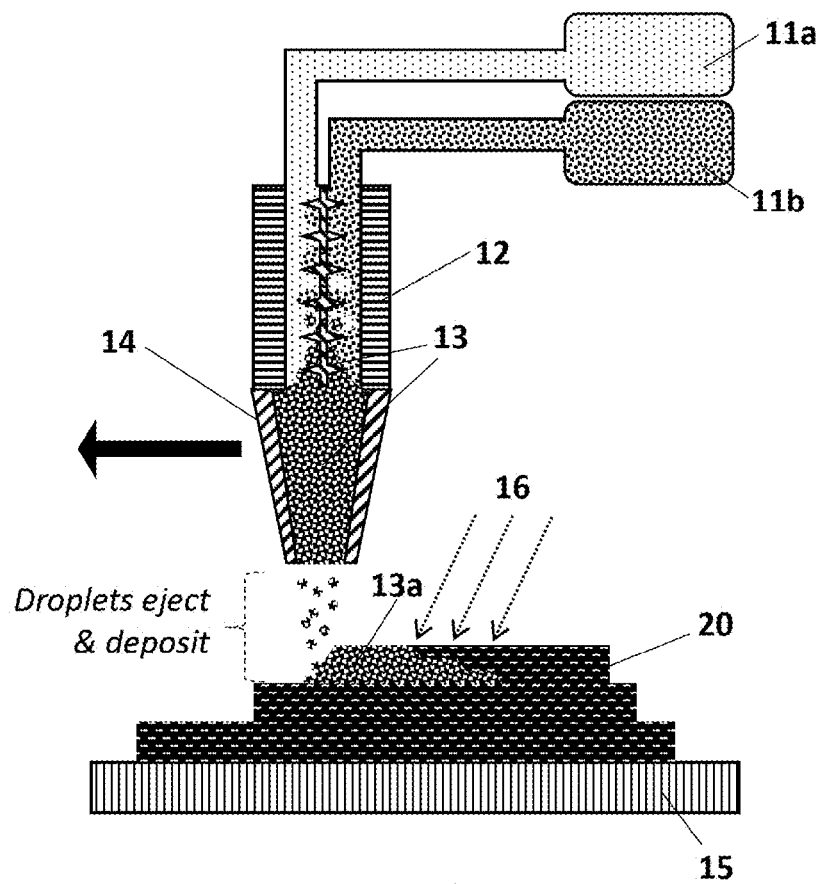
FIG. 1 schematically illustrates a first embodiment of methods and apparatus as described herein, in which Precursor Resin A and Precursor Resin B are mixed in a mixer, which may be a heated mixer, just prior to being deposited.

The present invention is now described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

Example dual cure resins, and corresponding precursor resins, that can be used to carry out the present invention include, but are not limited to, those set forth in U.S. Pat. Nos. 10,350,823; 9,676,963; 9,453,142; and 9,598,606 to Rolland et al.

A first non-limiting embodiment of an apparatus for carrying out methods described herein is given in FIG. 1. The apparatus includes a build platform 15 on which an object 20 can be produced. The apparatus includes a nozzle 14 (typically part of a printing head), which is operatively associated with a mixer (e.g., a static or dynamic mixer) 12. The mixer is in some embodiments heated, though heating is not required in all cases. The mixer is operatively associated with independent reservoirs of a first precursor resin 11a and a second precursor resin 11b, which when mixed provide a complete resin—a dual cure resin 13 in the embodiment shown. The dual cure resin is dispensed to form a deposited resin portion 13a in a growing object 20. A light source such as an ultraviolet light source 16 is preferably included.

Figure 2:
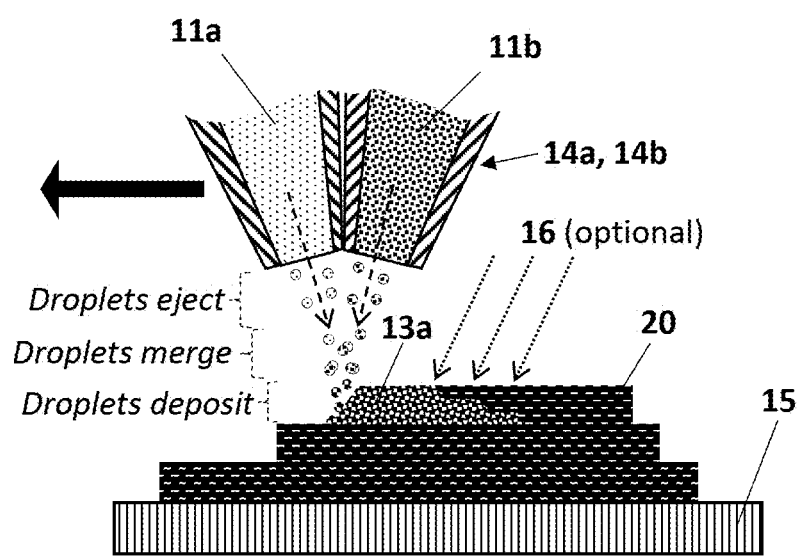
FIG. 2 schematically illustrates a second embodiment of methods and apparatus as described herein, in which Precursor Resin A and Precursor Resin 13 merge after ejection as they are deposited.

A second non-limiting embodiment of an apparatus for carrying out methods described herein is given in FIG. 2. The apparatus includes:
  (a) a printing head having at least a first and second nozzle (14a, 14b) through which precursor resins (11a, 11b) can be jetted;
  (b) a build platform 15 on which a 3D object 20 can be formed by successive deposition of deposited resin portions 13a from the jetted precursor resins;
  (c) a positioning apparatus operatively associated with the printing head and the build platform (not shown; implemented in accordance with known techniques);
  (d) a first precursor resin supply operatively associated with the first nozzle (not shown, implemented in like manner as in FIG. 1);
  (e) a second precursor resin supply operatively associated with the second nozzle (not shown, implemented in like manner as in FIG. 1);
  (f) the first nozzle and the second nozzle configured (e.g., by angling the nozzles or nozzle orifices, and/or by biasing the shape of the nozzle orifices) to combine the precursor resins after being jetted and produce a complete (single or dual cure) resin prior to or upon forming the deposited resin portions.

In some embodiments, a light source (e.g., an ultraviolet light source 16) is operatively associated with the build platform and configured to photopolymerize the deposited resin portion (e.g., when the deposited resin portion comprises a dual cure resin).

In both FIG. 1 and FIG. 2, components such as drives, mounts, chassis, and controls for moving the print head, pumps for feeding the precursor resins, and the like, are not shown for purposes of clarity, but these can be implemented in accordance with known techniques or variations thereof that will be apparent to those skilled in the art, such as described in U.S. Pat. No. 6,259,962 to Gothait and US Patent Application Publication No. US 2020/0156308 to Ramos et al., the disclosures of which are incorporated herein by reference in their entirety.

Printheads with nozzles for inkjet 3D printing that can be used in carrying out printing methods as described herein are known. Examples include but are not limited to those commercially available from Xaar 3D Ltd, Unit 5-6 William Lee Building, Nottingham Science Park, Nottingham NG7 2RQ, United Kingdom. Additional and alternative embodiments can be produced in accordance with known techniques based on the information given herein.

Note that objects can be formed directly onto a reusable, general purpose, carrier platform, or formed on another, pre-formed, object mounted onto the carrier platform, such as described in Cole, US Patent App. Publication No. US 2019/0255863 (Align Technology, Method of Inkjet Printing Onto Aligners).

In some embodiments, a method of making a three-dimensional object includes the steps of:
  (a) jetting droplets of at least one dual cure resin or precursor thereof through at least one nozzle carried by a print head of a 3D printing apparatus to form a deposited dual cure resin portion, the dual cure resin comprising a first polymerizable component and a second polymerizable component, wherein the first component is photopolymerizable and the second component is polymerizable by a mechanism different from the first component;
  (b) polymerizing the first component with light (e.g., ultraviolet (UV) light);
  (c) repositioning the print head; and (d) repeating steps (a) through (c) to form a newly deposited dual cure resin portion on or adjacent to the previously deposited dual cure resin portion until an intermediate three-dimensional object is formed; and (e) curing the second component by a mechanism different from the first component to produce the three-dimensional object.

In some embodiments of the foregoing, which may be carried out with the apparatus of FIG. 1, the dual cure resin is produced by providing first and second precursor resins, with the precursor resins being combined in a mixer, the mixer connected to the at least one nozzle, to form the dual cure resin prior to jetting the resin from the nozzle. See also US 2019/0283316 to Rolland et al.

In some embodiments of the foregoing, one of the precursor resins comprises an unblocked polyisocyanate, and the other of the precursor resins comprises a polyol, a polyamine, or a combination thereof. Resins comprising unblocked isocyanates are preferred in some embodiments, as they have very low viscosities and may react very quickly during printing with amines or alcohols. Such components of the resins may be cured by heat (baking), contact to water (e.g. in liquid, vapor, or aerosol form), or combinations thereof. In some embodiments a post-print bake may not be required due to the rapidity of the reaction.

"Unblocked" polyisocyanate as used herein refers to monomers/prepolymers that have two or more isocyanate groups that have not been and/or are not blocked with a blocking group (e.g., a thermally labile blocking group such as t-butylaminoethyl methacrylate (TBAEMA), as exemplified in U.S. Pat. Nos. 10,350,823; 9,676,963; 9,453,142; and 9,598,606 to Rolland et al.). In other words, the two or more isocyanate groups are free to participate in chemical reactions such as with a polyamine or polyol.

Polyisocyanates (including diisocyanates) useful in carrying out the present invention include monomer an oligomeric polyisocyanates, including, but not limited to, 1,1'-methylenebis(4-isocyanatobenzene) (MDI), 2,4-diisocyanato-1-methylbenzene (TDI), methylene-bis(4-cyclohexylisocyanate) (H12MDI), hexamethylene diisocyanate (HDI), HDI trimer, isophorone diisocyanate (IPDI), 4,4'-methylenebis(cyclohexyl isocyanate) (HMDI), polymeric MDI, 1,4-phenylene diisocyanate (PPDI), and o-tolidine diisocyanate (TODI). In some embodiments, the polyisocyanates are isocyanate prepolymers, examples of which include, but are not limited to, isocyanate capped polyols, such as the reaction product of molar excess of HDI with polytetramethylene glycol (PTMEG), etc. Additional examples include but are not limited to those given in U.S. Pat. No. 3,694,389 to Levy.

Examples of polyols (e.g., diols or triols) include, but are not limited to, polymeric triols such as VORONOL™ 3136 Polyol and polycaprolactone triol, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, hydroquinone bis(2-hydroxyethyl) ether (HQEE), glycerol, trimethylolpropane (TMP), 1,2,6-hexanetriol, and pentaerythritol. Natural oil polyols (biopolyols) may also be used. Such polyols may be derived, e.g., from vegetable oils (triglycerides), such as soybean oil, by known techniques. See, e.g., U.S. Pat. No. 6,433,121 to Petrovic et al.

Polyurethane catalysts which may be included in resins of the present invention include those that may catalyze the reaction of isocyanate with hydroxyl groups, and include, but are not limited to, a tin catalyst (e.g., dibutyltin dilaurate), a zirconium catalyst (e.g., zirconium chelate) such as K-KAT 36212 (King Industries, Inc., Norwalk, Connecticut), a bismuth catalyst (e.g., bismuth carboxylate) such as K-KAT XK-651 (King Industries, Inc., Norwalk, Connecticut), a zinc catalyst (e.g. zinc carboxylate), a nickel catalyst (e.g., nickel carboxylate), a tertiary amine catalyst (e.g., TBAEMA), etc.

Examples of polyamines include, but are not limited to, diamines (for example, 4,4'-methylenedicyclohexanamine (PACM), 4,4'-methylenebis(2-methylcyclohexyl-amine) (MACM), ethylene diamine, isophorone diamine, diethyltoluenediamine), aromatic amines, and polyetheramines (for example, poly(tetramethylene oxide) (PTMO) diamines, JEFFAMINE® from Huntsman Corporation).

In some embodiments of the foregoing, the at least one dual cure resin or precursor thereof is heated (e.g., to 50, 60, or 70 degrees Centigrade, or more) prior to the jetting step to reduce the viscosity thereof (e.g., to 100 cP or less).

In some embodiments of the foregoing, the at least one dual cure resin or precursors thereof comprises a solvent in an amount (e.g., 10 percent by weight to 50 or 75 percent by weight) effective to reduce the viscosity thereof during the expelling or jetting step (e.g., a glycol ether, alcohol, or volatile solvent such as a hydrofluorocarbon solvent (e.g., a 2,3-dihydrodecafluoropentane solvent such as VERTREL™ XM)).

In some embodiments of the foregoing, at least a portion (preferably a major portion) of the solvent evaporates from the droplets prior to the droplets forming the deposited dual cure resin portion.

Note that, in some embodiments of the foregoing, the light-cured polymer component can be minimal and only needed as a "molecular scaffold" during the printing process. This is because of the lower shear forces applied to the growing object, as compared to bottom-up additive manufacturing techniques such as continuous liquid interface production (CLIP). Accordingly, in some embodiments, the first component is included in the resin in an amount of not more than 5, 10, 15, or 20 percent by weight.

Examples of reactive end groups for monomers/prepolymers suitable for use as the photopolymerizable first component include, but are not limited to: acrylates, methacrylates, ☐-olefins, N-vinyls, acrylamides, methacrylamides, styrenics, epoxides, thiols, 1,3-dienes, vinyl halides, acrylonitriles, vinyl esters, maleimides, vinyl ethers, and mixtures thereof.

The methods described herein above lend themselves to combining multiple different dual cure resins to create composite articles. Thus, in some embodiments, the method may further include:

(i) at least two different dual cure resins or precursors thereof that, when used individually, would generate finished objects of different tensile properties (e.g., rigid versus elastic), which are provided through separate orifices; and (ii) the jetting step includes selectively jetting the at least two different dual cure resins or precursors thereof (sequentially, concurrently, or combinations thereof) in a patterned manner to form a three-dimensional object having different tensile properties in different portions thereof (e.g. an object with rigid portions joined by a flexible hinge portion).

In some embodiments of any of the foregoing, the second component of the resin comprises a precursor to a polyurethane, polyurea, epoxy polymer, cyanate ester polymer, silicone polymer, or combination thereof.

In some embodiments of the foregoing, the curing step (e) is carried out after forming the three-dimensional object, and may be carried out, e.g., by heating, microwave irradiating, contacting to water, exposure to light at a wavelength different from that at which the first component is polymerized, contacting to a catalyst, or a combination or two ore more thereof.

A cleaning step, such as by washing, blowing, wiping, centrifugal separation, or combination thereof, may be applied to the object before a subsequent curing step, in accordance with known techniques.

Also herein described is a method (e.g., for use with an apparatus exemplified in FIG. 2) of making a three-dimensional object, that includes the steps of:
  (a) concurrently jetting droplets of first and second precursor resins through separate nozzles, the nozzles optionally carried by the same print head of a 3D printing apparatus, the nozzles configured to combine the precursor resins after jetting and produce a complete (single or dual cure) resin prior to or upon forming a deposited resin portion;
  (b) optionally photopolymerizing the deposited resin portion (e.g., with UV light);
  (c) repositioning the print head; and
  (d) repeating steps (a) through (c) to form a newly deposited resin portion on or adjacent to the previously deposited resin portion, until the three-dimensional object is formed.

In some embodiments, the complete resin comprises a dual cure resin, and the photopolymerizing step (b) is included.

In some embodiments, one of the precursor resins comprises an unblocked polyisocyanate, and the other of the precursor resins comprises a polyol, a polyamine, or a combination thereof. As noted above, resins comprising unblocked isocyanates are preferred in some embodiments, as they have very low viscosities and may react very quickly during printing with amines or alcohols. Such resins may be cured by heat (baking), contact to water (e.g. in liquid, vapor, or aerosol form), or combinations thereof. In some embodiments a post-print bake may not be required due to the rapidity of the reaction.

In some embodiments, one or both of the precursor resins is heated (e.g., to 50, 60, or 70 degrees Centigrade, or more) prior to the jetting step to reduce the viscosity thereof (e.g., to 100 cP or less).

In some embodiments, one or both of the precursor resins comprises a solvent in an amount (e.g., 10 percent by weight to 50 or 75 percent by weight) effective to reduce the viscosity thereof during the jetting step (e.g., a glycol ether, alcohol, or volatile solvent such as a hydrofluorocarbon solvent (e.g., a 2,3-dihydrodecafluoropentane solvent such as VERTREL™ XM)).

In some embodiments, at least a portion (preferably a major portion) of the solvent evaporates from the droplets prior to the droplets forming the deposited resin portion (e.g., in the regions identified by "droplets eject" and "droplets merge" in FIG. 2). Multi-color printing of objects can be readily implemented with the methods and apparatus used in the present invention such as those described in connection with FIG. 1 and FIG. 2 herein. As a non-limiting example, five different "Part A" precursor resins can be provided, each with the same UV curable crosslinker, a photoinitiator, and reactive component (e.g., a diepoxide monomer) but each containing a different pigment (e.g., cyan, magenta, yellow, black, or white). A corresponding "Part B" precursor resin could contain a further reactive component that optionally cross-reacts with a reactive component of the Part A resins. The resins can then be selectively dispensed in a patterned manner, to provide different colors in different regions of the three-dimensional objects, depending on the amount of each Part A resin dispensed for each region.

Support materials can be dispensed from other nozzles on print heads associated with the apparatus of FIG. 1 and FIG. 2 in accordance with known techniques, including those that produce water soluble supports, supports soluble in organic solvents, and supports that are soluble in weak acids or weak bases.

The foregoing is illustrative of the present invention, and is not to be construed as limiting thereof. The invention is defined by the following claims, with equivalents of the claims to be included therein.

What is claimed is:

1. A method of making a three-dimensional object, comprising:
  (a) jetting droplets of at least one dual cure resin or precursor thereof through at least one nozzle carried by a print head of a three-dimensional printing apparatus to form a deposited dual cure resin portion, the dual cure resin comprising a first polymerizable component and a second polymerizable component, wherein said first component is photopolymerizable and said second component is polymerizable by a mechanism different from said first component;
  (b) polymerizing said first component with light;
  (c) repositioning said print head; and
  (d) repeating steps (a) through (c) to form a newly deposited dual cure resin portion on or adjacent to a previously deposited dual cure resin portion until an intermediate three-dimensional object is formed; and then
  (e) applying heat and/or moisture to said intermediate three-dimensional object to cure said second component and produce said three-dimensional object,
  wherein said at least one dual cure resin or precursor thereof comprises a solvent in an amount effective to reduce the viscosity thereof during said jetting step, and
  wherein at least a portion of said solvent evaporates from said droplets prior to said droplets forming said deposited dual cure resin portion.

2. The method of claim 1, wherein said dual cure resin is produced by providing first and second precursor resins, with said precursor resins being combined in a mixer, the mixer operatively connected to said at least one nozzle, to form said dual cure resin prior to jetting said resin from said nozzle.

3. The method of claim 2, wherein one of said precursor resins comprises an unblocked polyisocyanate, and the other of said precursor resins comprises a polyol, a polyamine, or a combination thereof.

4. The method of claim 1, wherein said at least one dual cure resin or precursor thereof is heated prior to said jetting step to reduce the viscosity thereof.

5. The method of claim 1, wherein said solvent is a volatile solvent.

6. The method according to claim 5, wherein at least a major portion of said solvent evaporates from said droplets prior to said droplets forming said deposited dual cure resin portion.

7. The method of claim 1, wherein said first component is included in said resin in an amount of not more than 10 percent by weight.

8. The method of claim 1, wherein:
(i) at least two different dual cure resins or precursors thereof that generate finished objects of different tensile properties are provided through separate orifices; and
(ii) said jetting step includes selectively jetting said at least two different dual cure resins or precursors thereof in a patterned manner to form a three-dimensional object having different tensile properties in different portions thereof.

9. The method of claim 1, wherein said second component comprises a precursor to a polyurethane, polyurea, epoxy polymer, cyanate ester polymer, silicone polymer, or combination thereof.

10. The method of claim 1, wherein said solvent is a volatile hydrofluorocarbon solvent.

11. The method of claim 1, wherein a major portion of said solvent evaporates from said droplets prior to said droplets forming said deposited dual cure resin portion.

* * * * *